United States Patent
Nagao

(10) Patent No.: US 7,299,375 B2
(45) Date of Patent: Nov. 20, 2007

(54) SIGNAL PROCESSING APPARATUS, REMOTE OPERATION SYSTEM, AND SIGNAL PROCESSING METHOD

(75) Inventor: Naoyuki Nagao, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 478 days.

(21) Appl. No.: 10/895,933

(22) Filed: Jul. 22, 2004

(65) Prior Publication Data

US 2005/0033815 A1 Feb. 10, 2005

(30) Foreign Application Priority Data

Jul. 23, 2003 (JP) .............................. 2003-278684

(51) Int. Cl.
*G06F 11/00* (2006.01)
(52) U.S. Cl. .......................................... 714/4; 709/217
(58) Field of Classification Search .................... 714/4; 709/217, 223, 219
See application file for complete search history.

(56) References Cited

U.S. PATENT DOCUMENTS

| | | | | |
|---|---|---|---|---|
| 5,913,034 | A * | 6/1999 | Malcolm | 709/223 |
| 6,388,658 | B1 * | 5/2002 | Ahern et al. | 345/168 |
| 6,681,250 | B1 * | 1/2004 | Thomas et al. | 709/226 |
| 7,003,563 | B2 * | 2/2006 | Leigh et al. | 709/223 |
| 2002/0054029 | A1 * | 5/2002 | Glancy et al. | 345/173 |
| 2004/0268012 | A1 * | 12/2004 | Ferguson | 710/313 |

FOREIGN PATENT DOCUMENTS

JP 2001-344189 12/2001

* cited by examiner

*Primary Examiner*—Dieu-Minh Le
(74) *Attorney, Agent, or Firm*—Staas & Halsey LLP

(57) ABSTRACT

A signal processing device that is used for remotely operating a server via a network includes: a first input unit that inputs an operation screen image of the server; an image processing unit that generates image data in accordance with the operation screen image; a first output unit that outputs the image data to the network; a second input unit that inputs operation information via the network, the operation information being required for operating the server; and a second output unit that outputs the operation information to the server.

19 Claims, 14 Drawing Sheets

SIGNAL PROCESSING APPARATUS, REMOTE OPERATION SYSTEM, AND SIGNAL PROCESSING METHOD

BACKGROUND OF THE INVENTION

1. Field of the Invention

The present invention relates to a signal processing apparatus, a remote operation system, a signal processing method and a computer program product.

2. Description of the Related Art

There is a technique of directly remote-operating a server on a network, as disclosed in Japanese Patent Application Publication No. 2001-344189. A remote-operation system that employs the above technique is shown in FIG. 1.

A system configuration shown in FIG. 1 has a plurality of server groups 910, each of which has a housing in which multiple servers 911 are housed. Each of the servers 911 is connected to a server switching device 901. The servers 911 and the server switching devices 901 may be connected together via connectors capable of transferring image data (for example, VGA (Video Graphics Array) connectors), keyboard connectors and mouse connectors (for example, PS/2® connectors).

The server switching devices 901 are connected to a network 903 such as a LAN (Local Area Network) or Internet, and communicate with an information processing apparatus 920, which may be a personal computer (hereinafter simply referred to as PC) or a workstation.

More particularly, upon receiving a request from the information processing apparatus 920, the server switching devices 901 selectively connect the information processing apparatus 920 with the servers 911 requested. The server switching devices 901 generate IP (Internet Protocol) packages on the basis of a display screen output via the VGA connectors from the servers 911, and send the IP packages to the information processing apparatus 920. The apparatus 920 receives the IP packages based on the IP address from the network 903, and displays a display screen on a monitor 921. The information processing apparatus 920 converts information on an operation entered using a keyboard or mouse on the display screen into IP packets, and sends these IP packets to the server switching devices 901. The devices 901 receive the IP packets related to the operation information on the basis of the IP addresses from the network 903, and extract the operation information therefrom. Then, the server switching devices 901 apply the operation information thus extracted to the keyboard connector or the mouse connector of the server 911.

The server switching devices 901 cause the information processing apparatus 920 to serve as an input/output device such as a monitor, keyboard and mouse connected to the selected servers 911. This provides the operator with a circumstance such that the above input/output device is directly connected to the servers 911.

Generally, each of the servers 911 is connected directly to the network 903 without the server switching devices 901. In this case, each of the serves 911 is equipped with a network adapter for making a connection with the network 903.

However, the system configuration shown in FIG. 1 needs a huge number of interconnection cables dependent on the number of servers 911. Examples of those interconnection cables are to connect the servers 911 and the server switching devices 901, and to connect the servers 911 and the network 903. Nowadays, the mainstream configuration in a large-scale system employs a single housing in which multiple servers 911 are housed as shown in FIG. 1. In this system configuration, a huge number of interconnection cables are gathered in a very narrow area, and has a difficulty in establishment and management.

SUMMARY OF THE INVENTION

It is an object of the present invention to provide a signal processing device, a remote operation system, a signal processing method and a computer program product that may be a recording medium, capable of easily configuring and managing the system.

This object of the present invention is achieved by a signal processing device that is used for remotely operating a server via a network, comprising: a first input unit that inputs an operation screen image of the server; an image processing unit that generates image data in accordance with the operation screen image; a first output unit that outputs the image data to the network; a second input unit that inputs operation information via the network, the operation information being required for operating the server; and a second output unit that outputs the operation information to the server.

The above object of the present invention is also achieved by a remote operation system comprising: a signal processing device that is connected to a server; and an information processing apparatus that remotely operates the server through the signal processing device, the signal processing device and the information processing apparatus being connected to each other via a network, the signal processing device including: a first input unit that inputs an operation screen image of the server; an image processing unit that generates image data in accordance with the operation screen image; a first output unit that outputs the image data to the information processing apparatus via the network; a second input unit that inputs operation information from the information processing apparatus via the network, the operation information being required for operating the server; and a second output unit that outputs the operation information to the server, the information processing apparatus including: a third input unit that inputs the image data outputted from the first output unit; a display unit that displays the image data; and a third output unit that outputs operation information of the server to the signal processing device via the network, the operation information of the server being inputted in accordance with the display unit.

The above object of the present invention is also achieved by A remote operation system comprising: a first signal processing device that is connected to a server; a second signal processing device that is connected to the first signal processing device via a network; and a monitor that is connected to the second signal processing device, the first signal processing device including: a first input unit that inputs an operation screen image of the server; an image processing unit that generates image data in accordance with the operation screen image; a first output unit that outputs the image data to the second signal processing device via the network; a second input unit that inputs operation information from the second signal processing device via the network, the operation information being required for operating the server; and a second output unit that outputs the operation information to the server, the second signal processing device including: a third input unit that inputs the image data outputted from the first output unit; a display unit that displays the image data on the monitor; and a third output unit that outputs operation information of the server to the first signal processing device via the network, the operation information of the server being inputted in accordance with the display unit.

The above object of the present invention is also achieved by a remote operation system comprising: a plurality of servers; a signal processing device that processes a signal outputted from one of the plurality of servers; a switching device that selectively connects the signal processing device to one of the plurality of servers; and an information processing apparatus that remotely operates one of the plurality of servers through the signal processing device, the signal processing device including: a first input unit that selectively inputs an operation screen image of one of the plurality of servers via the switching device; an image processing unit that generates image data in accordance with the operation screen image; a first output unit that outputs the image data to the information processing apparatus via the network; a second input unit that inputs operation information from the information processing apparatus via the network, the operation information being required for operating the server; and a second output unit that outputs the operation information to the server via the switching device, the information processing apparatus including: a third input unit that inputs the image data outputted from the first output unit; a display unit that displays the image data; and a third output unit that outputs operation information of the server to the signal processing device via the network, the operation information of the server being inputted in accordance with the display unit.

The above object of the present invention is also achieved by a method of processing a signal in a device for remotely operating a server via a network, the method comprising the steps of: inputting an operation screen image from the server; generating image data in accordance with the operation screen image; outputting the image data to the network; inputting operation information via the network, the operation information being required for operating the server; and outputting the operation information to the server.

The above-mentioned object of the present invention is also achieved by a computer program product for causing a computer to remotely operate a server via a network, the computer program product comprising instructions to be executed by the computer to: generate image data in accordance with an operation screen image that is inputted from the server; output the image data to the network; input operation information via the network, the operation information being required for operating the server; and output the operation information to the server.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

The following is a description of preferred embodiments of the present invention, with reference to the accompanying drawings.

First Embodiment

Figure 1:
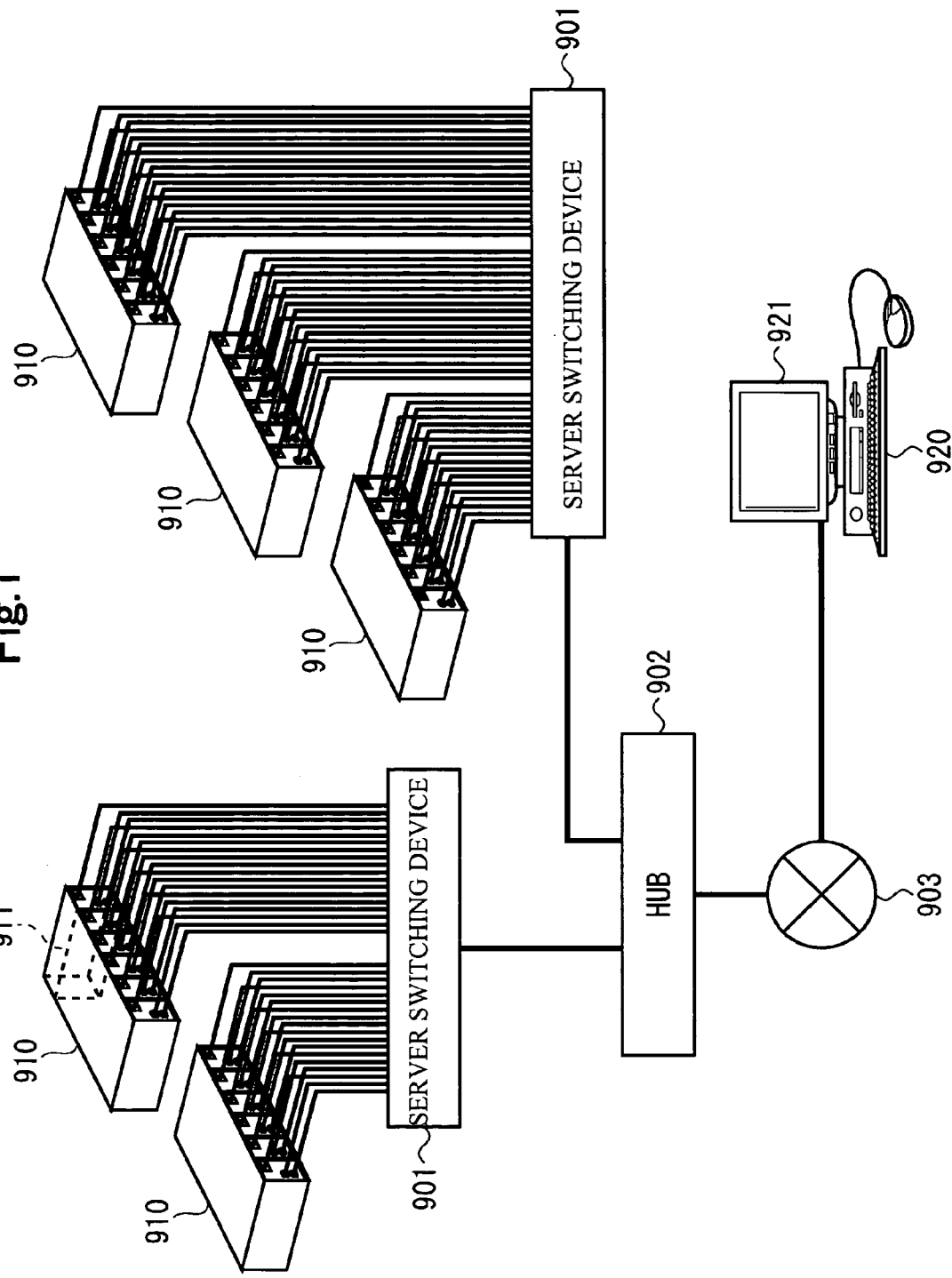
FIG. 1 is a block diagram illustrating a conventional remote operation system.
Figure 2:
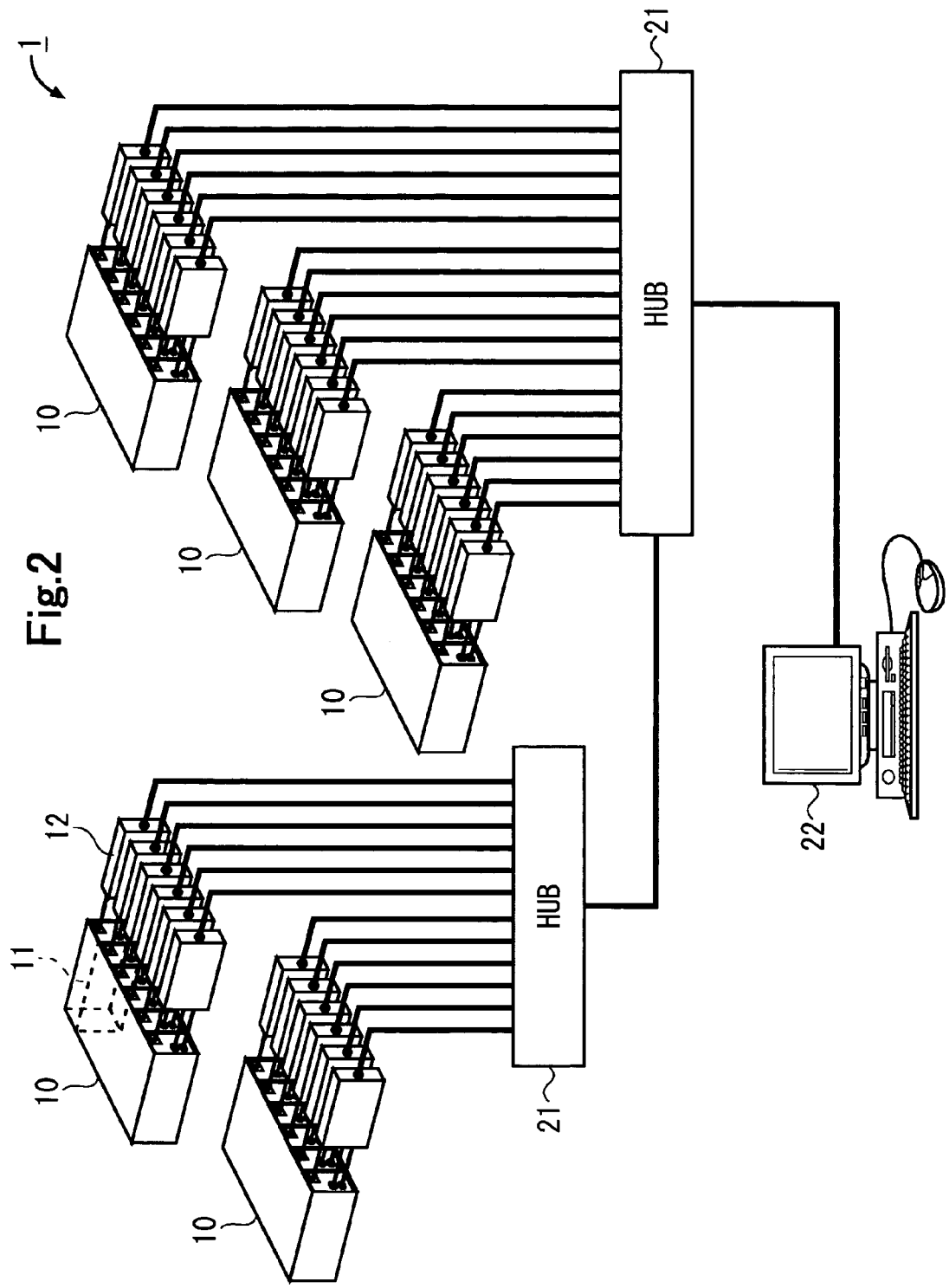
FIG. 2 is a block diagram illustrating the structure of a remote operation system in accordance with a first embodiment of the present invention.

A first embodiment of the present invention will be first described in detail. FIG. 2 is a block diagram illustrating the structure of a remote operation system 1 that includes signal processing devices 12 in accordance with this embodiment.

As shown in FIG. 2, the remote operation system 1 includes server groups 10 each having servers 11 housed in one housing. Each of the servers 11 is a server module that is called a "blade server". The server groups 10 house the servers 11 in housings called "chassis". However, the present invention is not limited to this structure, and may be applied to an information processing apparatus such as a personal computer or a server that has an independent structure.

The signal processing devices 12 of this embodiment are connected to the servers 11 one by one. As will be described later, each signal processing device 12 is connected to each corresponding server 11 through the connectors provided to the server 11 for connecting display units and input units such as a keyboard, a mouse, and a monitor (a keyboard connector, a mouse connector, and a video terminal), and a serial connector such as an RS-232C connector (see FIG. 3).

Each of the signal processing devices 12 has a function of connecting with a network such as a LAN (Local Area Network) and the Internet. Accordingly, an operator accesses the signal processing devices 12 through a personal computer (PC) 22 in the network, so as to remotely operate the servers 11.

Figure 3:
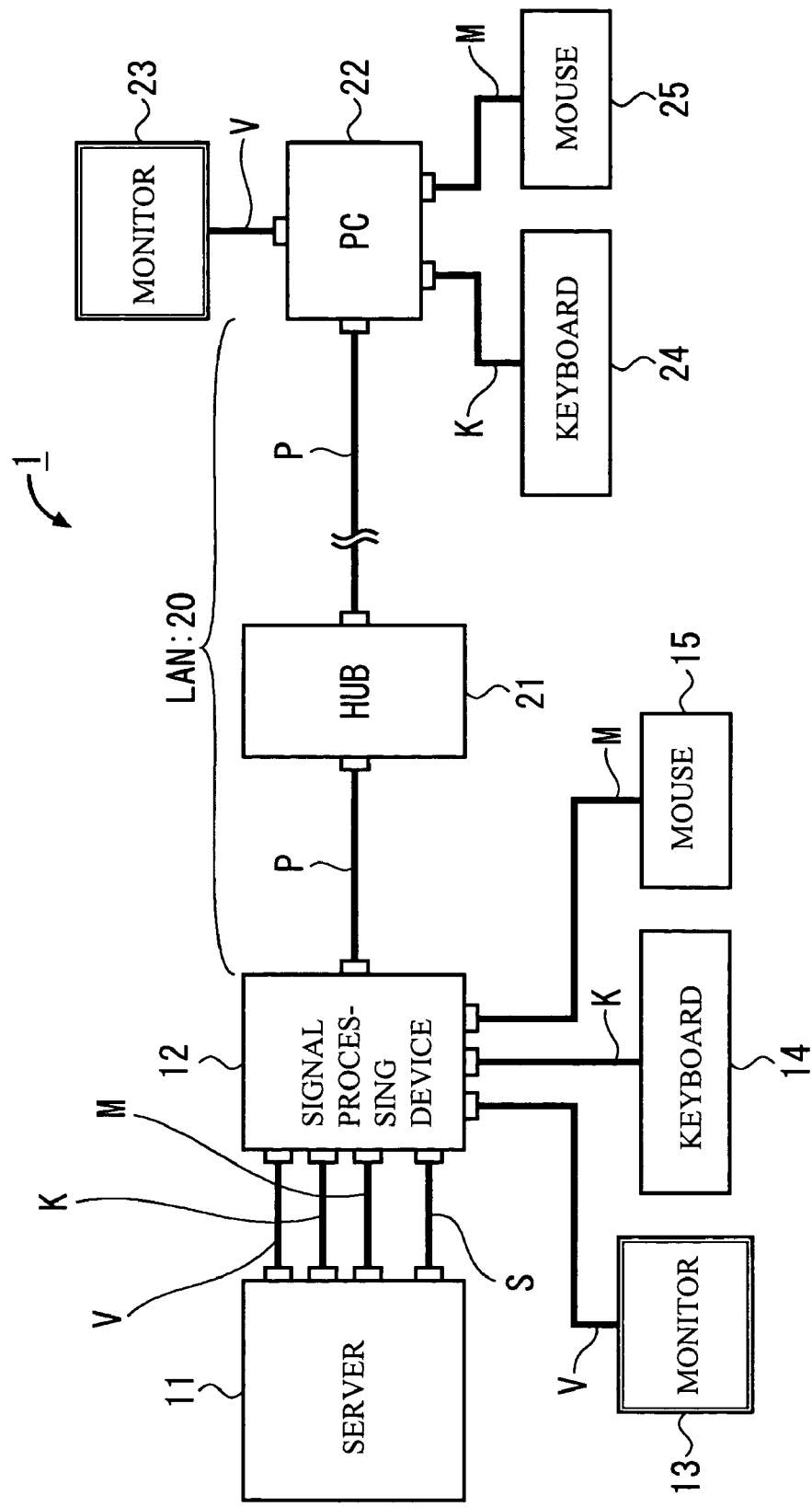
FIG. 3 is a block diagram schematically illustrating the structure of the remote operation system of FIG. 2.

Referring now to FIG. 3, the structure of the remote operation system 1 will be described in greater detail. As shown in FIG. 3, the remote operation system 1 includes the servers 11, the signal processing devices 12, and the PC 22.

Each of the servers 11 is designed to locally connect with a monitor, a keyboard, and a mouse. As described earlier, each of the signal processing devices 12 is connected to each corresponding server 11 through the connectors for a monitor, a keyboard, and a mouse. More specifically, each of the signal processing devices 12 is connected to the video terminal, the keyboard connector, the mouse connector, and the serial connector of each corresponding server 11 through cables.

The video terminal of each server 11 may be a DVI (Digital Visual Interface) connector or a RGB connector. More specifically, each server 11 may be connected to each corresponding signal processing device 12 through a DVI display connecting interface or by an output image signal technique utilizing RGB (Red, Green, and Blue) to output an operation image. The keyboard connector and the mouse connector of each server 11 may be PS/2 connectors or USB (Universal Serial Bus) connectors. The serial connector of each server 11 may be an RS-232C connector, or the like.

Each of the signal processing devices 12 is designed to be capable of locally connecting with display units and input units such as a monitor 13, a keyboard 14, and a mouse 15. In this embodiment, using a console that is formed with the monitor 13, the keyboard 14, and the mouse 15 locally connected to each signal processing device 12, input can be performed on the signal processing device 12 in a GUI (Graphical User Interface) environment, and input can also be performed on each server 11 through each corresponding signal processing device 12.

Each signal processing device 12 can also be accessed by an operator through the PC 22 over the network, as already mentioned. In the following, an example case where a signal processing device 12 is connected to the PC 22 via a HUB 21, or where the network is a LAN (local Area Network) 20, will be described.

The monitor 23 as a display unit and the keyboard 24 and the mouse 25 as input units are connected to the PC 22. The display unit and the input units are controlled by the PC 22, and provide the GUI environment to operators.

Figure 4:
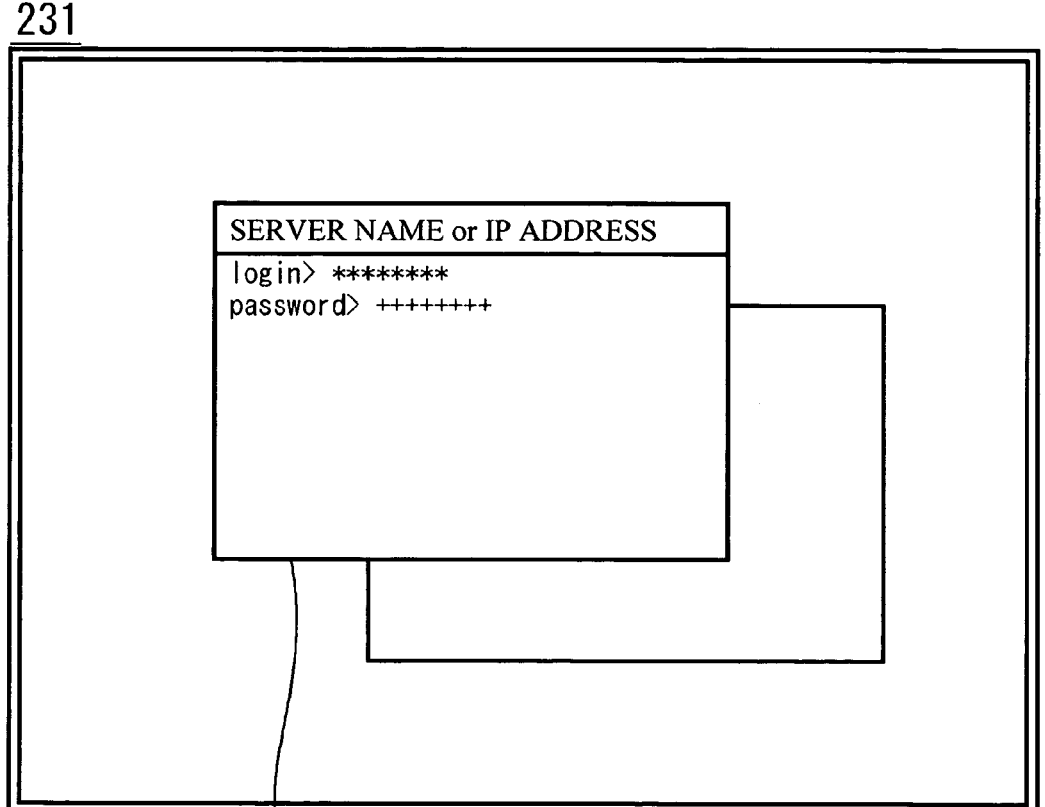
FIG. 4 illustrates a display screen that is displayed on the monitor of the PC shown in FIG. 3.

In the above described structure, an operator accesses the signal processing device 12 through the PC 22, using identification information for identifying the IP (Internet Protocol) address of the signal processing device 12 or for identifying the signal processing device 12. By doing so, the operator makes a request to the signal processing device 12 for a remote operation of the corresponding server 11. Upon receipt of the request for a remote operation of the server 11 from the PC 22, the signal processing device 12 generates image data (in the bitmap format, for example) of the display screen of the server 11 (hereinafter referred to as the "operation screen"), based on a video signal V (in the form of digital data or analog data in a DVI format; in the form of analog data in an RGB format) outputted from the server 11. The signal processing device 12 then turns the image data into an IP packet, and outputs the IP packet to the LAN 20. The PC 22 analyzes the IP packet received through the LAN 20, and reconstructs the image data of the operation screen. The PC 22 then displays the reconstructed image data in a terminal window on the monitor 23. FIG. 4 shows the operation screen image 232 displayed in a terminal window on the display screen 231 of the monitor 23.

When an input operation is performed with the operation screen image 232 through the keyboard 24 or the mouse 25, the PC 22 also converts the inputted operation code into an IP packet P, and transmits the IP packet P to the signal processing device 12 via the LAN 20. The signal processing device 12 analyzes the IP packet P received from the PC 22, and reconstructs the operation code. The signal processing device 12 then inputs the reconstructed operation code into the server 11 through connectors such as the keyboard connector, the mouse connector, the USE connector, and the serial connector. The server 11 carries out a process in accordance with the operation code inputted from the signal processing device 12. Here, the operation code is a signal that is generated from the keyboard based on the key matrix, or a signal that is generated from the mouse based on the amount of movement or the click. The operation code can also be regarded as operation information.

In this manner, the operation screen of the server 11 is displayed on the monitor 23 of the PC 22 via a network such as the LAN 20, and the operation code entered from the operation screen is inputted into the server 11 via the network. Thus, the server 11 can be remotely operated by an operator through the PC 22 that is connected to the server 11 via the network.

FIG. 4 shows the initial state of the operation screen image 232 when an access is made. As shown in FIG. 4, the operation screen image 232 in the initial state demands that an operator inputs a login name (Login>) and a password (Password>) that are part of the identification information. This is a normal login screen of a general server. The operator should input the login name and the password that are allotted to him/her, through the operation screen image 232 of the PC 22. By doing so, the operator can log in with the server 11.

The operation screen image outputted from the server 11 is constantly updated. While the server 11 is accessed, the image data of the updated operation screen or the data of the difference between the updated operation screen and the previous operation screen are generated based on a monitor signal V, and are transmitted to the PC 22 via the LAN 20. In this manner, the operation screen image 232 displayed on the monitor 23 of the PC 22 can be always synchronized with the latest screen image of the server 11.

Figure 5:
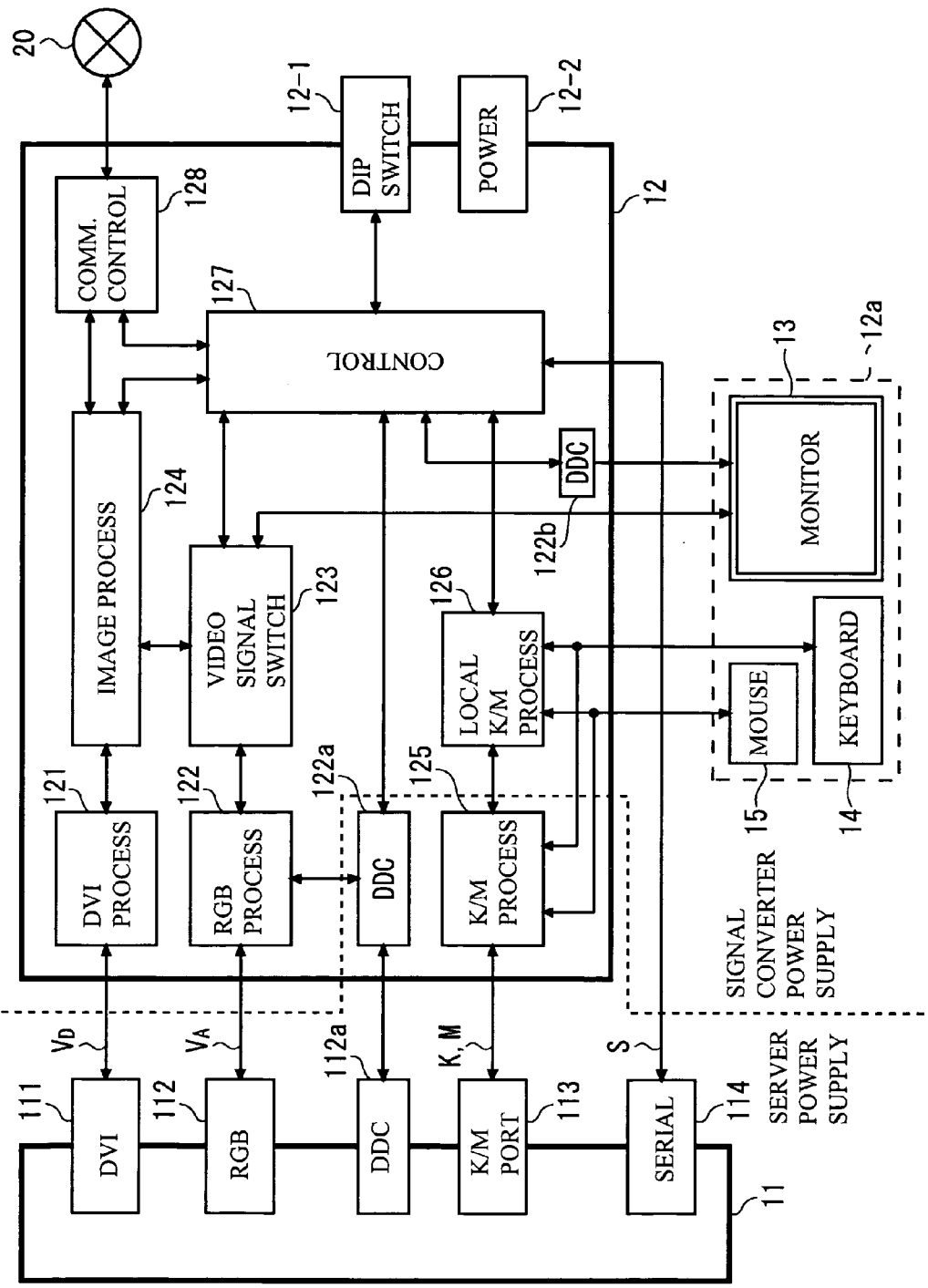
FIG. 5 is a block diagram illustrating the structure of the signal processing device in accordance with the first embodiment of the present invention.

Referring now to FIG. 5, the inner structure of the signal processing device 12 will be described in detail. FIG. 5 is a block diagram illustrating the structure of the signal processing device 12 in accordance with this embodiment. Described below is an example case where DVI-format and RGB-format display connecting interfaces are provided in the server 11, a video signal to be inputted into a DVI processing unit 121 is a digital signal, and the monitor 13 locally connected to the signal processing device 12 is an analog RGB monitor.

As shown in FIG. 5, the signal processing device 12 includes the DVI processing unit 121, a RGB processing unit 122, a video signal switching unit 123, an image processing unit 124, a K/M processing unit 125, a local K/M processing unit 126, a control unit 127, and a communication processing unit 128.

The control unit 127 includes a CPU (Central Processing Unit), and controls the other components, which are the DVI processing unit 121, the RGB processing unit 122, the video signal switching unit 123, the image processing unit 124, the KIM processing unit 125, the local KIM processing unit 126, and the communication processing unit 128. The control unit 127 also performs operations that will be described later.

The DVI processing unit 121 receives a DVI video signal $V_D$ that is outputted from a DVI terminal 111 of the server 11. The digital video signal $V_D$ received by the DVI processing unit 121 is then inputted into the image processing unit 124.

In a case where the video signal $V_D$ inputted through the DVI processing unit 121 is to be outputted to the LAN 20, the image processing unit 124 generates image data in the bitmap format or the GIF (Graphics Interchange Format) or JPEG (Joint Photographic Experts Group) format, based on the video signal $V_D$. The image processing unit 124 then inputs the image data into the communication processing unit 128. Based on the image data, the communication processing unit 128 generates an IP packet P, and transmits the IP packet P to the LAN 20.

The communication processing unit 128 is a structure that controls communication with a network such as the LAN 20, and is equivalent to the MAC (Media Access Control layer) or the PHY (Physical layer) of a LAN, the SIE (Serial Interface Engine) of an USB, and an RS-232C transceiver.

In a case where the video signal $V_D$ inputted through the DVI processing unit 121 is to be outputted to the locally connected monitor 13, on the other hand, the image processing unit 124 converts the video signal $V_D$ into an analog signal (a video signal $V_A$; an analog video signal will be hereinafter denoted by $V_A$), and inputs the analog signal into the video signal switching unit 123. However, the conversion of the video signal $V_D$ into an analog signal may be carried out by the RGB processing unit 122. In that case, the image processing unit 124 inputs the video signal $V_D$ directly into the video signal switching unit 123. The video signal switching unit 123 in turn inputs the video signal $V_D$ into the RGB processing unit 122. The RGB processing unit 122 converts the video signal $V_D$ into an analog signal (a video signal $V_A$), and inputs the video signal $V_A$ into the video signal switching unit 123. If the monitor 13 is a DVI monitor, the signal processing device 12 can input the video signal $V_D$, which has been received through the DVI processing unit 121, into the monitor 13 via the video signal switching unit 123, without carrying out any conversion process.

After receiving the video signal $V_A$ that is an analog signal converted from a digital signal, the video signal switching unit 123 outputs the video signal $V_A$ to the locally connected monitor 13. By doing so, the operation screen image of the server 11 outputted from the DVI terminal 111 can be displayed on the monitor 13 locally connected to the signal processing device 12.

Meanwhile, the RGB processing unit 122 receives a RGB video signal $V_A$ that is outputted from a RGB terminal 112 of the server 11. The video signal $V_A$ that is an analog signal received by the RGB processing unit 122 is inputted into the video signal switching unit 123.

In a case where the video signal $V_A$ inputted through the RGB processing unit 122 is to be outputted to the LAN 20, the video signal switching unit 123 inputs the video signal $V_A$ into the image processing unit 124. The image processing unit 124 converts the video signal $V_A$ into a digital signal (a video signal $V_D$; each digital video signal will be hereinafter denoted by $V_D$). Based on the video signal $V_D$, the image processing unit 124 generates image data in a bitmap format or a GIF (Graphics Interchange Format) or a JPEG (Joint Photographic Experts Group) format. The image processing unit 124 then inputs the image data into the communication processing unit 128. In the same manner as described earlier, the communication processing unit 128 converts the image data into an IP packet P, and transmits the IP packet P to the LAN 20.

In a case where the video signal $V_A$ inputted through the RGB processing unit 122 is to be outputted to the locally connected monitor 13, on the other hand, the video signal switching unit 123 inputs the video signal $V_A$ directly into the monitor 13. By doing so, the operation screen image of the server 11 outputted from the RGB terminal 112 can be displayed on the monitor 13 that is locally connected to the signal processing device 12.

Which one of the two different display connecting interfaces should be used is determined by a DIP (Dual Inline Package) switch 12-1 provided in the signal processing device 12 or which one of the terminals (the DVI terminal 111 and the RGB terminal 112) is connected to the signal processing device 12. The DIP switch 12-1 is a switch for performing various setting operations in the signal processing device 12. Other than the above, the various setting operations include switching between IPv4 and IPv6 in the communication function, switching on and off a PnP (Plug and Play) and PHCP (Dynamic Host Configuration Protocol) automatic allocation function, switching between Half-Duplex communication and Full-Duplex communication, switching on and off an automatic negotiation function, and setting an operation mode.

The signal processing device 12 also includes DDCs (Display Data Channels) 122a and 122b for inputting the information as to the display capacity of the monitor 13 or the monitor 23 into the server 11. The DDC 122a is connected to a DDC terminal 112a of the server 11. Accordingly, the server 11 outputs a video signal $V_D/V_A$ in accordance with the display capacity information inputted from the signal processing device 12. Here, the DDCs 122a and 122b are compliant to any one of the following three standards: the DDC-1, the DDC-2B, and the DDC-2AB. The DDC 122a is to provide the server 11 with a virtual situation in which a monitor is directly connected to the server 11. Therefore, the DDC 112a should be operated by power supplied from the server 11.

So as to provide the image processing unit 124 with the above described processing capacity, the image processing unit 124 should be formed with a programmable operation processing unit, such as a field programmable gate array (FPGA). The image processing unit 124 that is a programmable operation processing unit can perform different operations. Accordingly, the structure can be simplified, and the production cost can be reduced. The image processing unit 124 may also be designed to perform image processing such as mosaic processing on image data.

The signal processing device 12 has the K/M processing unit 125 to provide the server 11 with a virtual situation in which the keyboard and/or the mouse are directly connected to the server 11. The K/M processing unit 125 inputs an operation code that is entered through the local K/M processing unit 126 into a K/M port 113 (equivalent to the keyboard connector and the mouse connector) of the server 11.

The K/M processing unit 125 inputs the operation code, which is entered from the keyboard 14 or the mouse 15 locally connected to the signal processing device 12, directly into the K/M port 113 of the server 11. The operation code entered through the local K/M processing unit 126 is the operation code of the PC 22 received from the LAN 20.

As described earlier, the K/M processing unit 125 provides the server 11 with the situation in which the keyboard and/or the mouse are directly connected to the server 11. Therefore, it is preferable to operate the K/M processing unit 125 by power supplied from the server 11. The other components of the signal processing device 12 operate by virtue of power supplied from the power supply unit 12-2.

The local K/M processing unit 126 functions when an input operation is performed through the keyboard 14 and the mouse 15 locally connected to the signal processing device 12. More specifically, when an operation code is entered by pressing a predetermined key (a function key or a special key, for example) of the keyboard 14 or the mouse 15, the local K/M processing unit 126 inputs the operation code into the control unit 127. Receiving the operation code inputted by the predetermined key pressing, the control unit 127 reads out a predetermined routine that is stored beforehand in a ROM (Read Only Memory) or the like (not shown), and provides the local operator with a suitable environment for performing an input operation with the signal processing device 12.

Figure 6:
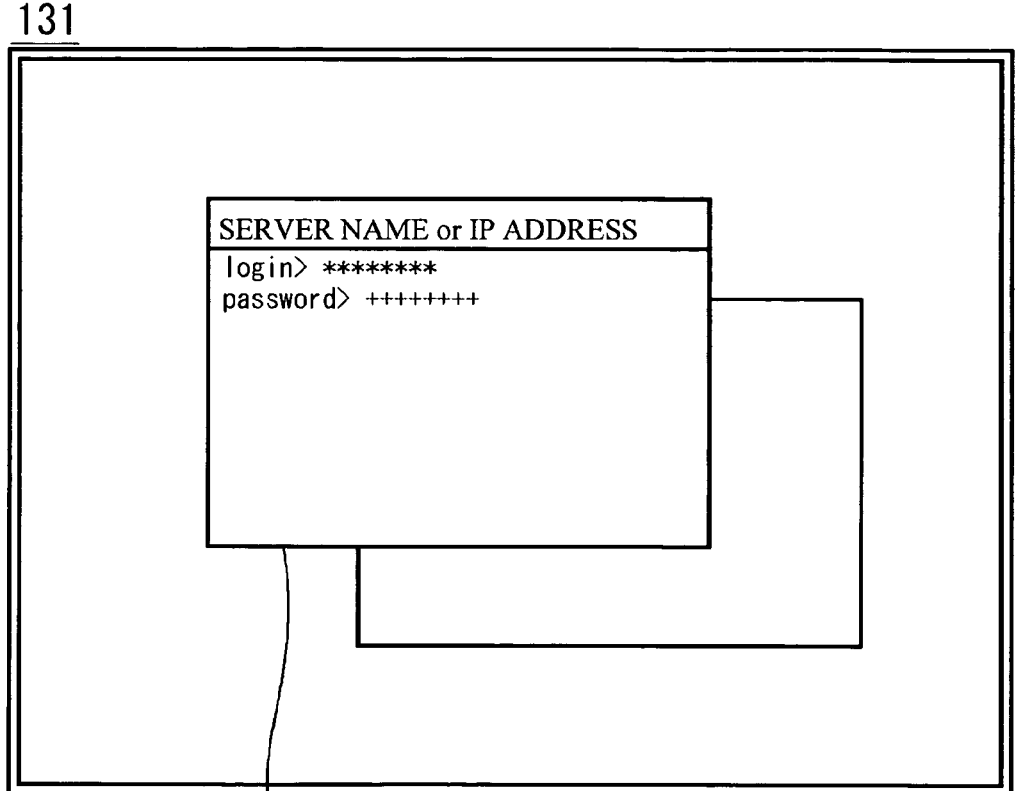
FIG. 6 shows a server operation screen that is displayed on the monitor locally connected to the signal processing device shown in FIG. 5.

In doing so, the control unit 127 carries out the following process. When the predetermined key pressing is performed, the control unit 127 reads out the predetermined routine, which serves as a trigger. In accordance with the predetermined routine, the control unit 127 generates a screen image (such as an OSD (On Screen Display) image, which will be hereinafter referred to as the console screen image) for performing an input operation with the signal processing device 12, and inputs the console screen image into the image processing unit 124. In accordance with the console screen image, the image processing unit 124 generates an analog video signal $V_C$, and inputs the video signal $V_C$ into the video signal switching unit 123. Here, the image processing unit 124 generates the video signal $V_C$ that is to be used for displaying a console screen image 132 in a pop-up window on the operation screen 131 of the server 11, as shown in FIG. 6. The video signal switching unit 123 superimposes the video signal $V_A$ of the operation screen 131 on the video signal $V_C$ inputted from the image processing unit 124 in such a manner that the console screen image 132 is displayed in the front. The video signal switching unit 124 then outputs the superimposed signal to the monitor 13. Accordingly, the console screen image 132 to be used for performing an input operation with the signal processing device 12 is displayed, in an overlaid fashion, on the monitor 13 that is locally connected to the signal processing device 12. FIG. 6 shows the operation screen 131 of the server 11 displayed on the monitor 13, on which the console screen image 132 is displayed in an overlaid fashion.

The local K/M processing unit 126 also inputs an operation code that is entered from the keyboard 14 or the mouse 15 through the console screen image 132 displayed on the monitor 13, into the control unit 127. In accordance with the operation code, the control unit 127 performs various setting operations and processes. Thus, an environment suitable for performing an input operation with the signal processing device can be realized.

The operation code of the PC 22 entered via the LAN 20 is also inputted into the local K/M processing unit 126. More specifically, the communication processing unit 128 receives an IP packet P transmitted from the PC 22 via the LAN 20. The communication processing unit 128 then analyzes the IP packet P and reconstructs the operation code. The reconstructed operation code is inputted into the local K/M processing unit 126 via the control unit 127. The local K/M processing unit 126 inputs the operation code directly into the K/M processing unit 125. The K/M processing unit 125 in turn inputs the operation code into the K/M port 113 of the server 11. In this manner, the operator of the PC 22 can be provided with an environment suitable for performing an input operation on the server 11 from a remote place.

The server 11 and the signal processing device 12 are connected to each other via a serial port 114. Serial data S that are outputted from the serial port S are converted into parallel data, and are then inputted into the control unit 127. If the inputted data S are the image data of a BIOS (Basic Input/Output System) setting screen of the server 11, the control unit 127 inputs the data S into the image processing unit 124. In a case where the setting screen image is to be displayed on the monitor 13 locally connected to the signal processing device 12, the control unit 127 controls the image processing unit 124 to generate an analog video signal $V_S$ based on the setting screen image, and to input the video signal $V_S$ into the video signal switching unit 123. Here, the video signal $V_S$ generated by the image processing unit 124 is to be used for displaying the setting screen image in a pop-up window on the operation screen 131 of the server 11 (see FIG. 6; however, the console screen image 132 should be replaced with the setting screen image). The video signal switching unit 123 superimposes the video signal $V_A$ of the operation screen 131 on the video signal $V_s$ inputted from the image processing unit 124 in such a manner that the setting screen image is displayed in the front. The video signal switching unit 123 then outputs the superimposed signal to the monitor 13. Thus, the setting screen image to be used for setting the BIOS is displayed on the monitor 13 that is locally connected to the signal processing device 12. In a case where the setting screen image is to be displayed on the monitor 23 of the PC 22, on the other hand, the control unit 127 controls the image processing unit 124 to generate the image data of the setting screen image, and superimposes the image data of the operation screen image 232 on the image data of the setting screen image. The superimposed image data are inputted into the communication processing unit 128. The communication processing unit 128 converts the superimposed image data into an IP packet, and transmits the IP packet to the PC 22.

It is also possible to input an operation code that is entered from a keyboard or a mouse into the server 11 via the serial port 114. In such a case, an operation code entered from the PC 22, for example, is reconstructed by the communication processing unit 128, and is inputted into the control unit 127. The operation code is then inputted from the control unit 127 into the serial port 114. Meanwhile, an operation code that is entered from the local console 12a is inputted into the control unit 127 via the local K/M processing unit 126, and is then inputted from the control unit 127 into the serial port 114. In this manner, the serial port 114 can be used as a video terminal (a terminal that outputs video signals), a keyboard connector, or a mouse connector.

In the above described structure, the control unit 127 should preferably be capable of transferring image data with efficiency in accordance with the band and the congestion level of the LAN 20. More specifically, the control unit 127 should preferably be capable of transmitting unit blocks of image data at random, or compressing image data and then transmitting the compressed image data.

Next, the operation flow of a remote operation to be performed on the server 11 by the PC 22, and the operation flow of an operation to be performed on the server 11 by the local console 12a connected to the signal processing device 12, will be described in detail, with reference to the accompanying drawings. The operations described below are performed under the control of the control unit 127.

Referring to the flowcharts of FIGS. 7 and 8, a remote operation to be performed on the server 11 by the PC 22 via the LAN 20 will be described below.

Figure 7:
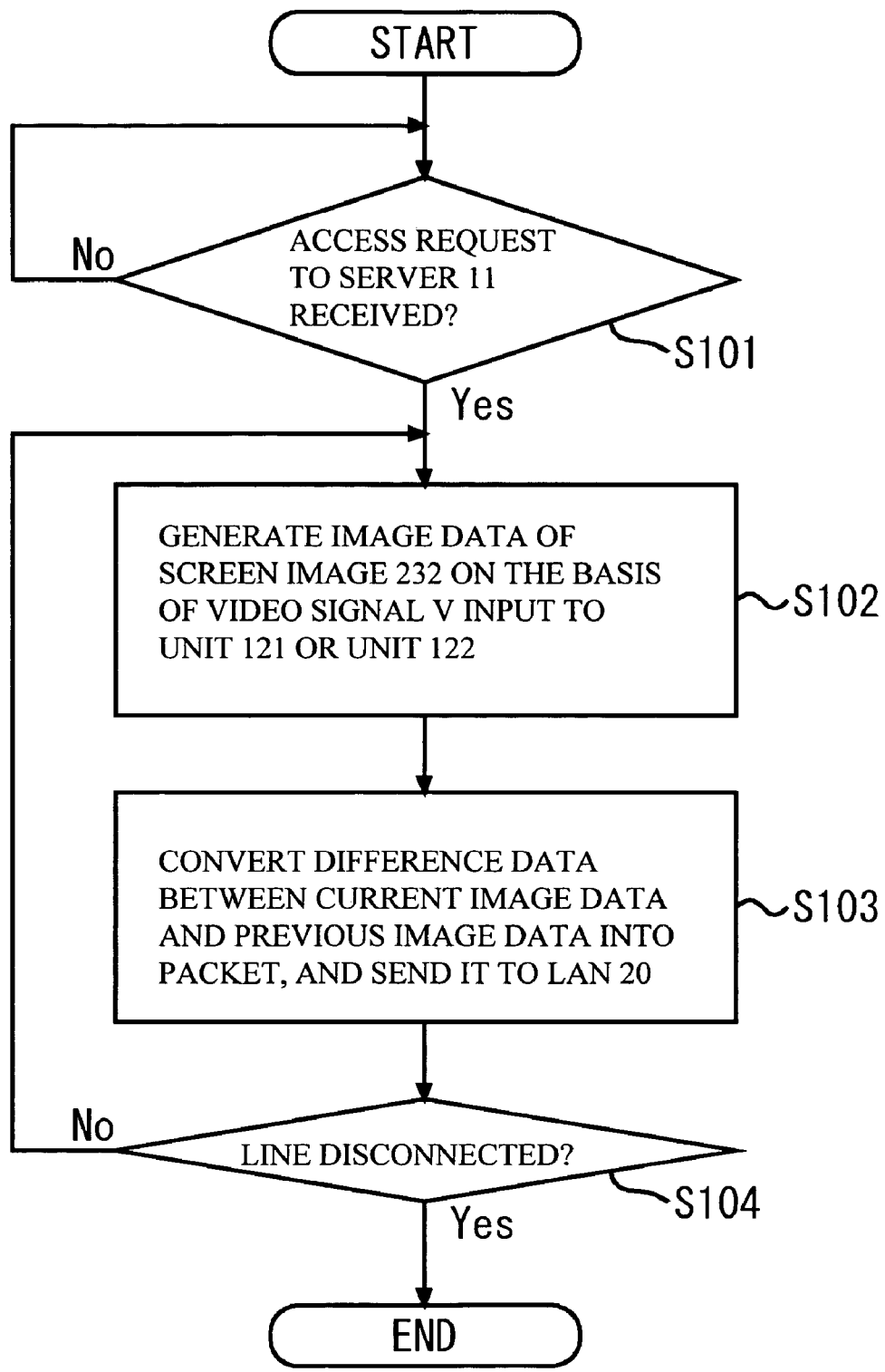
FIG. 7 is a flowchart of an operation to be performed by the control unit of the signal processing device when an operation screen image of the server is transmitted to the PC in the first embodiment of the present invention.

As shown in FIG. 7, the communication processing unit 128 receives a request for access to the server 11 from the PC 22. When the request for access is inputted into the control unit 127 (step S101), the control unit 127 controls the image processing unit 124 to generate the image data of the operation screen image 232 in accordance with a video signal V that is inputted through the DVI processing unit 121 or the RGB processing unit 122 (step S102). For ease of explanation, any video signal will be hereinafter denoted by V, whether analog or digital. The generated image data are then inputted into the communication processing unit 128. The communication processing unit 128 converts the image data into an IP packet P, and transmits the IP packet P to the PC 22 (step S103). If the image data generated in the previous operation still exist in step S103, the control unit 127 controls the image processing unit 124 to generate the difference data between the previously generated image data and the currently generated image data, and the IP packet P of the difference data is transmitted to the PC 22.

The control unit 127 repeats the procedures of steps S102 and S103 as long as the server 11 is accessed by the PC 22, or until the line between the PC 22 and the signal processing device 12 is disconnected (step S104). In this manner, the operation screen image of the server 11 displayed on the PC 22 is constantly updated with the latest image.

Figure 8:
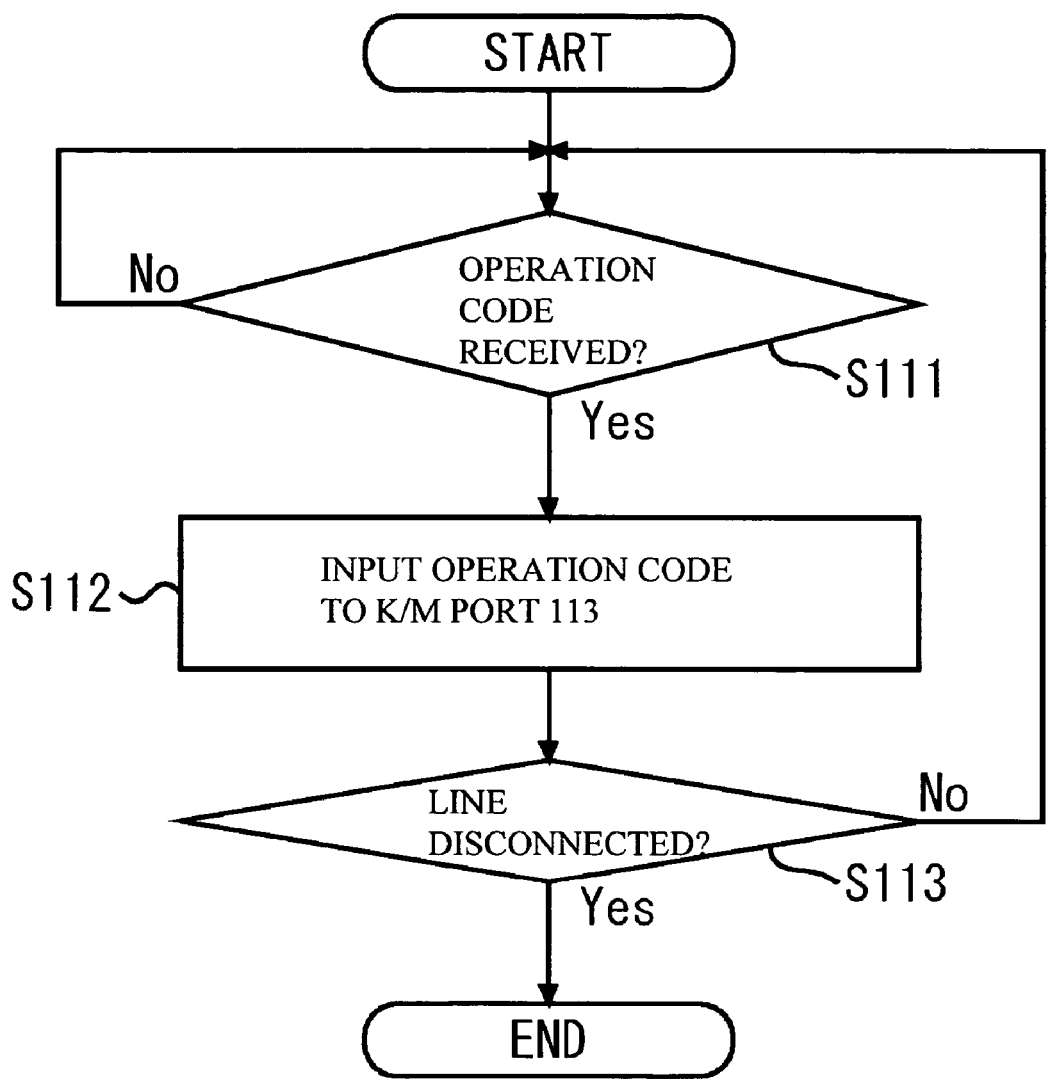
FIG. 8 is a flowchart of an operation to be performed by the control unit of the signal processing device when an operation code of the server is entered from the PC in the first embodiment of the present invention.

Referring now to FIG. 8, if the control unit 127 receives an operation code from the PC 22 through the operation screen image 232 displayed in accordance with the above operation flow while the signal processing device 12 is in communication with the PC 22 (step S111), the control unit 127 inputs the operation code into the K/M port 113 of the server 11 (step S112). By doing so, the server 11 can be remotely operated. The procedures of steps S111 and S112 are repeated as long as the server 11 is accessed by the PC 22, or until the line between the PC 22 and the signal processing device 12 is disconnected (step S113).

Referring now to the flowcharts of FIGS. 9 through 11, the procedures to be carried out to operate the server 11 by the local console 12a, which is connected to the signal processing device 12, will be described in detail.

Figure 9:
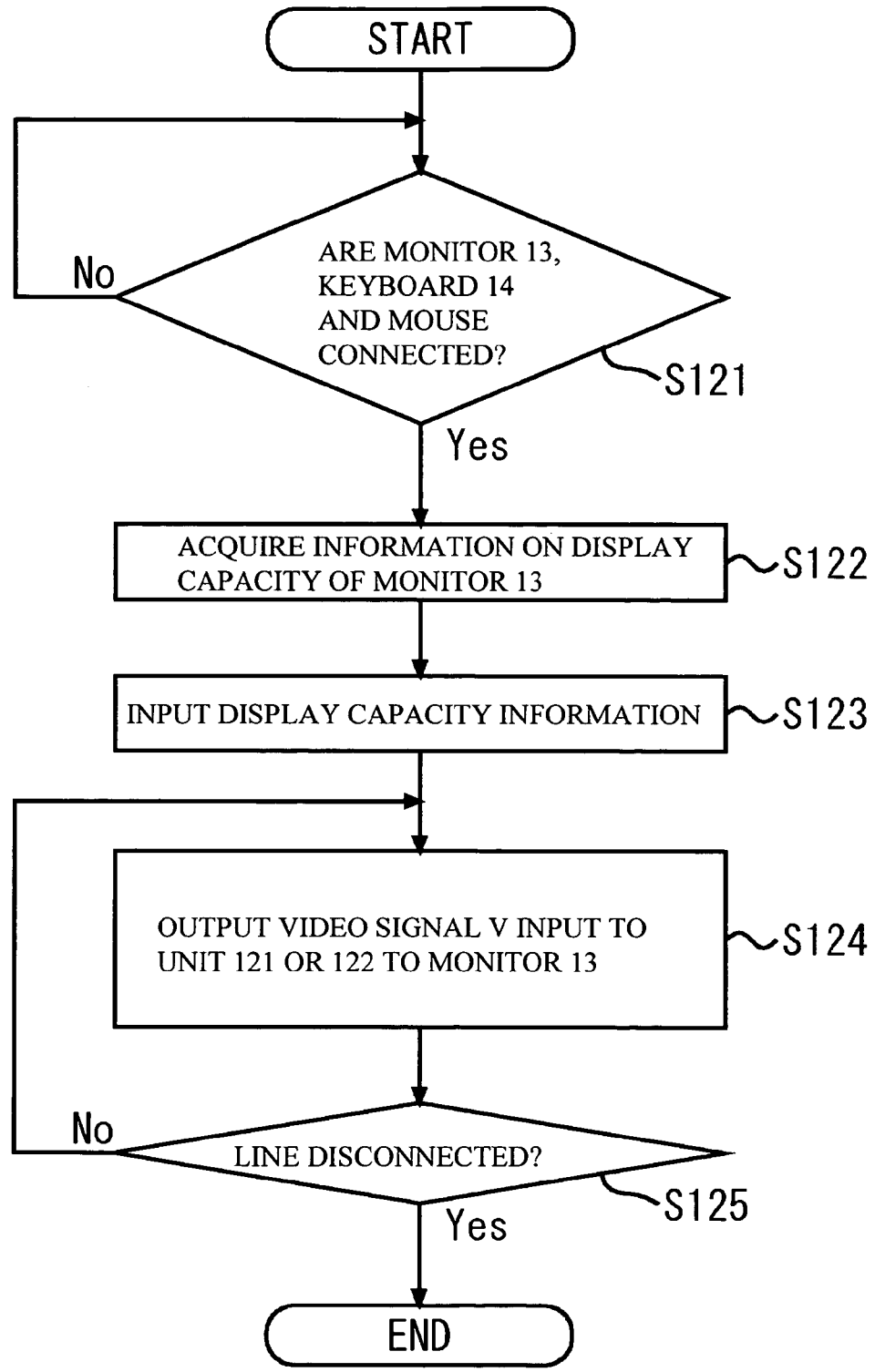
FIG. 9 is a flowchart of an operation to be performed by the control unit when an operation screen image of the server is outputted to the monitor that is locally connected to the signal processing device in the first embodiment of the present invention.

As shown in FIG. 9, when detecting the connection between the signal processing device 12 and the set of the monitor 13, the keyboard 14, and the mouse 15, or when detecting the connection between the signal processing device 12 and the monitor 13 ("Yes" in step S121), the control unit 127 acquires information as to the display capacity of the monitor 13 through the DDC 122b (step S122), and inputs the display capacity information into the DDC terminal 112a via the DDC 122a (step S123). The control unit 127 then controls the video signal switching unit 123 to output a video signal V (an analog signal converted by the image processing unit 124) inputted through the DVI processing unit 121, or a video signal V inputted through the RGB processing unit 12, to the monitor 13 (step S124). By doing so, the operation screen 131 of the server 11 can be displayed on the monitor 13 that is locally connected to the signal processing device 12. The procedure of step S124 is repeated until the line between the monitor 13 and the signal processing device 12 is disconnected (step S125). Thus, the operation screen 131 displayed on the monitor 13 is constantly updated with the latest screen image.

Figure 10:
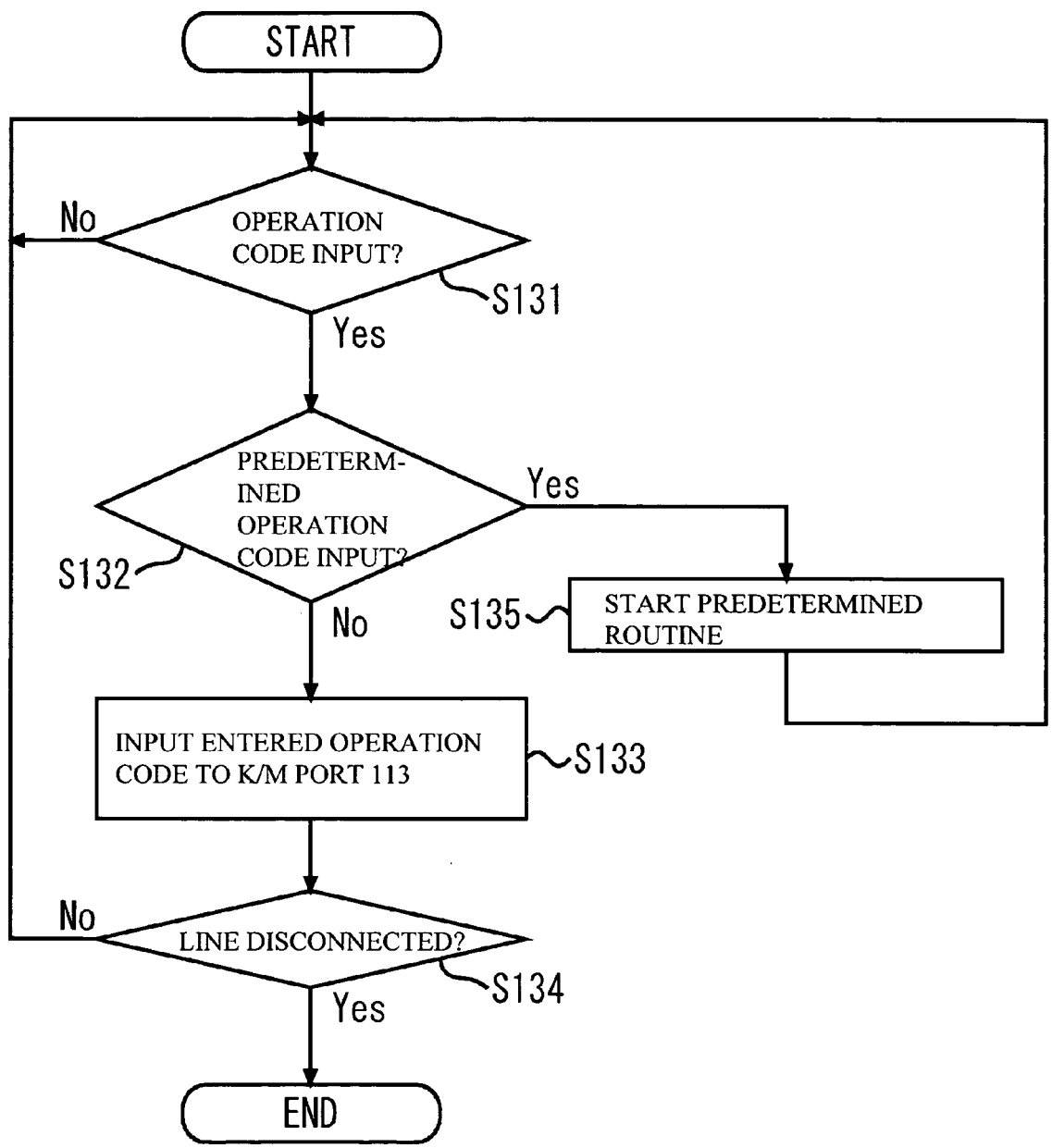
FIG. 10 is a flowchart of an operation to be performed by the control unit when an operation code of the server is entered from the keyboard or the mouse that is locally connected to the signal processing device in the first embodiment of the present invention.

Referring now to FIG. 10, while the line is connected between the signal processing device 12 and the monitor 13, the control unit 127 determines whether an operation code is entered from the keyboard 14 or the mouse 15 (of the local console 12a) that is locally connected to the signal processing device 12 (step S131). When an operation code is entered from the local console 12a ("Yes" in step S131), the control unit 127 determines whether the operation code is a predetermined operation code entered by pressing a predetermined key (step S132). If the operation code is the predetermined operation code ("Yes" in step S132), a predetermined routine that is stored beforehand in a ROM or the like is activated (step S135). The operation then returns to step S131, and the control unit 127 waits for an operation code to be entered from the local console 12a.

If the operation code entered in step S131 is not the predetermined operation code ("No" in step S132), the control unit 127 inputs the operation code into the K/M port 113 of the server 11 from the local K/M processing unit 126 via the K/M processing unit 125 (step S133). The control unit 127 repeats the procedures of steps S131 through S133 and the procedure of step S135 until the line between the local console 12a and the signal processing device 12 is disconnected (step S134). Thus, an environment suitable for performing an input operation on the server 11 through the local console 12a can be realized.

Figure 11:
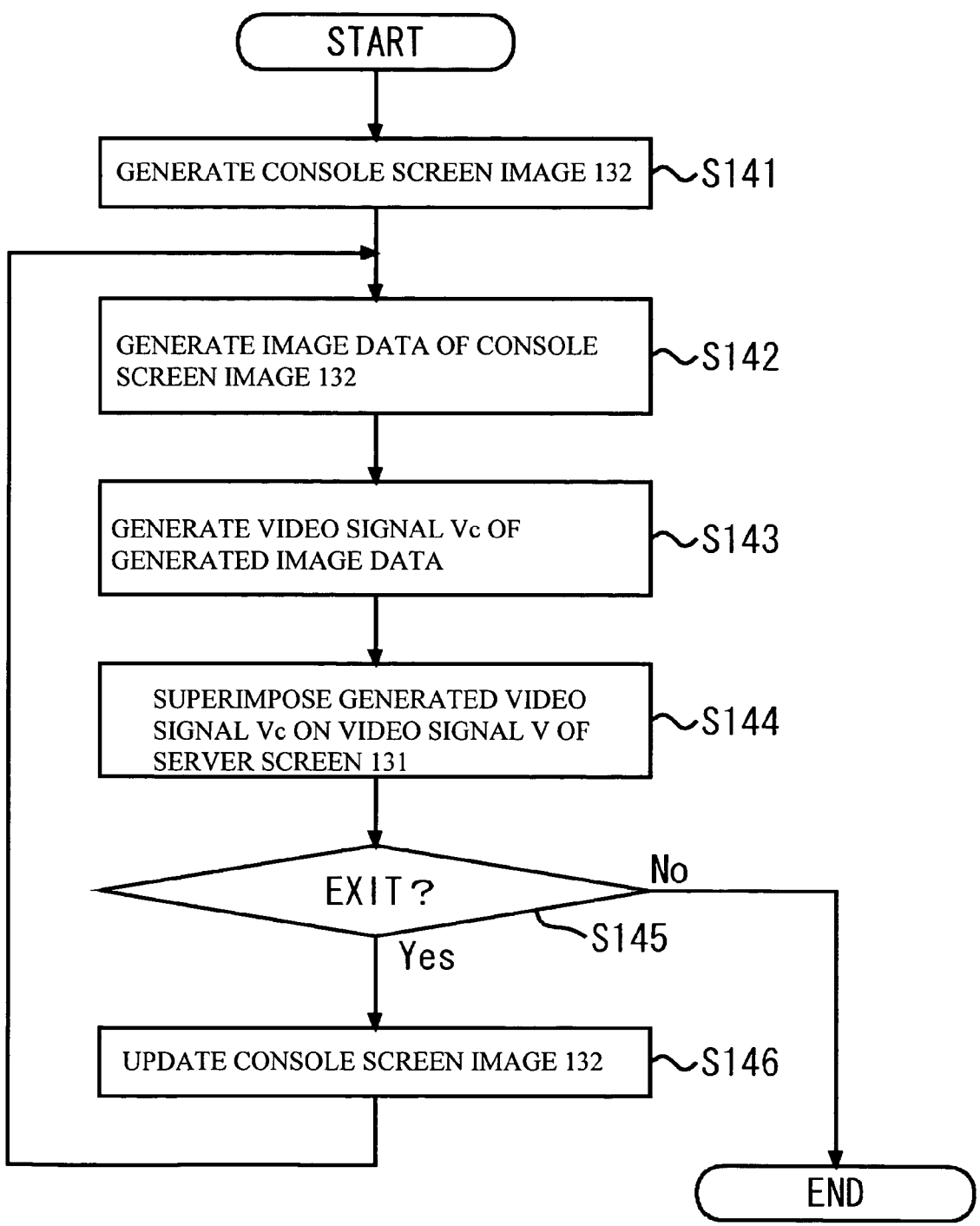
FIG. 11 is a flowchart showing the predetermined routine started in step S135 in FIG. 15, as well as an operation to be performed by the control unit when a console screen image of the signal processing device is displayed on the monitor that is locally connected to the signal processing device.

Referring now to FIG. 11, the predetermined routine that is started in step S135 in the flowchart of FIG. 10 will be described.

When the predetermined routine is started, the control unit 127 first generates the console screen image 132 (step S141), and inputs the console screen image 132 into the image processing unit 124. The control unit 127 controls the image processing unit 124 to generate the image data of the console screen image 132 (step S142). The control unit 127 then controls the image processing unit 124 to generate a video signal $V_C$ of the image data (step S143), and to superimpose the video signal V of the operation screen 131 on the video signal $V_C$ (step S144). Here, the video signal V is the video signal V inputted in step S124 in the flowchart of FIG. 9. Accordingly, in step S124 in FIG. 9, the video signal V outputted to the monitor 13 is a video signal superimposed with the video signal $V_c$. Thus, the monitor 13 can display the operation screen 131 on which the console screen image 132 is shown in an overlaid fashion. The control unit 127 then determines whether an instruction to exit from the predetermined routine (an exit command) has been issued (step S145). In a case where such an instruction has been issued ("Yes" in step S145), the operation exits from the predetermined routine. In a case where such an instruction has not been issued ("No" in step S145), the control unit 127 updates the console screen image 132 (step S146), and returns to step S142.

Figure 12:
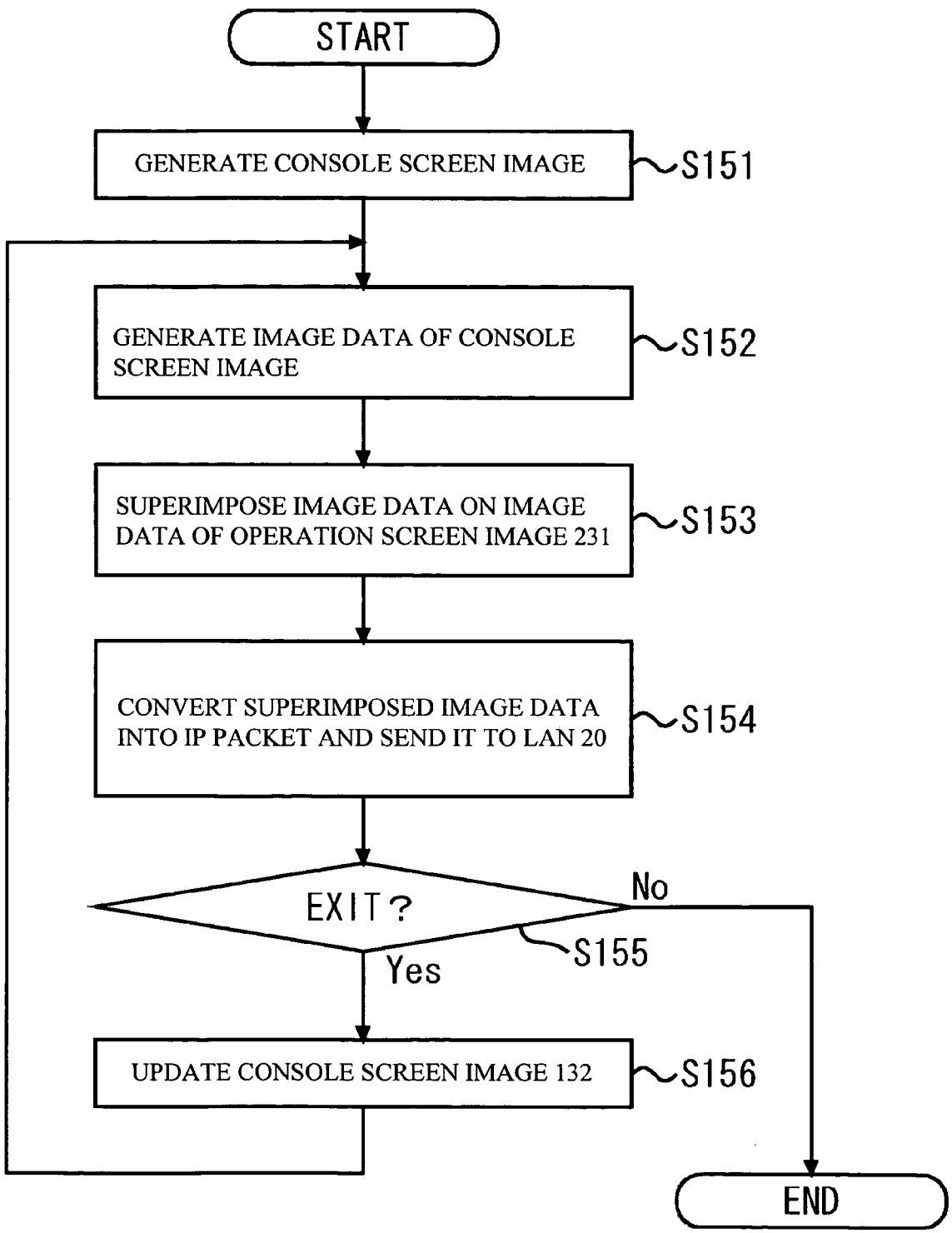
FIG. 12 is a flowchart showing the predetermined routine started in step S135 in FIG. 10, as well as an operation to be performed by the control unit when a console screen image of the signal processing device is displayed on the monitor of the PC.

In a case where the console screen of the signal processing device 12 is to be displayed on the monitor 23 of the PC 22, the control unit 127 first generates a console screen image (step S151), as shown in FIG. 12. The control unit 127 inputs the console screen image into the image processing unit 124, which in turn generates the image data of the console screen image (step S152). The control unit 127 then superimposes the image data of the operation screen image 232 on the image data of the console screen image (step S153), and inputs the superimposed data into the communication processing unit 128. The communication processing unit 128 converts the image data of the operation screen image 232, which are superimposed on the image data of the console screen image, into an IP packet P, and then transmits the IP packet P to the PC 22 via the LAN 20 (step S154). The control unit 127 then determines whether an instruction to exit from the predetermined routine (an exit command) has been issued (step S155). In a case where such an instruction has been issued ("Yes" in step S155), the operation exits from the predetermined routine. In a case where such an instruction has not been issued ("No" in step S155), the control unit 127 updates the console screen image (step S156), and then returns to step S152.

In the above manner, an environment suitable for performing a remote operation on the server 11 through the PC 22 that is connected to the server 11 via a network can be realized, and the signal processing device 12 that can provide such an environment can be obtained. Also, an environment suitable for performing a direct input operation on the server 11 through the local console 12a, which is locally connected to the signal processing device 12, can be realized.

The above described first embodiment is merely one of the preferred embodiments of the present invention, and various changes and modifications can be made to it as follows.

Second Embodiment

Figure 13:
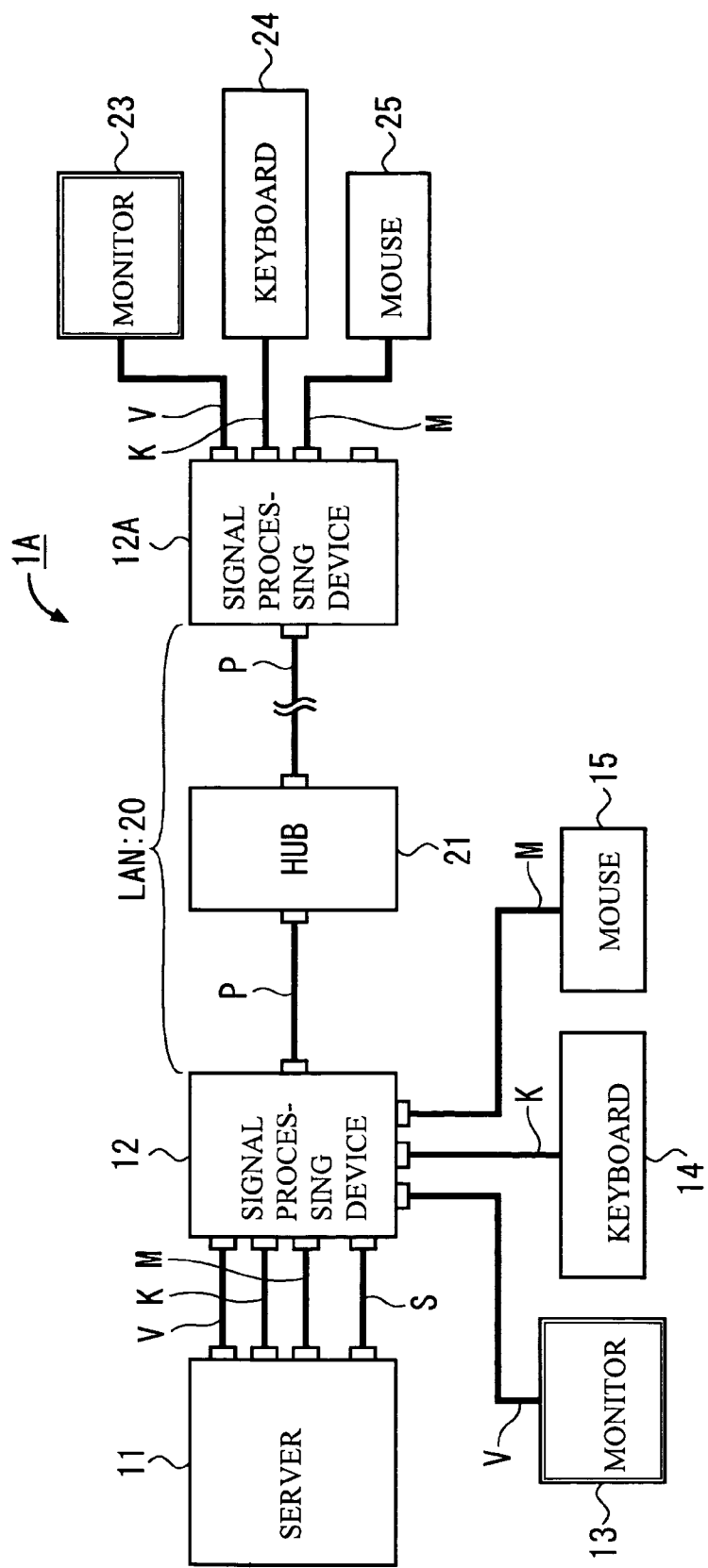
FIG. 13 is a block diagram schematically illustrating the structure of a remote operation system in accordance with a second embodiment of the present invention.

Referring now to FIG. 13, a second embodiment of the present invention will be described in detail. FIG. 13 schematically illustrates the structure of a remote operation system 1A in accordance with this embodiment. In the following description, the same components as those of the first embodiment are denoted by the same reference numerals as those of the first embodiment, and explanation of them will not be provided.

The remote operation system 1A shown in FIG. 13 differs from the remote operation system 1 of the first embodiment shown in FIG. 3 in that the PC 22 locally connected to the signal processing device 12 via a network (the LAN 20) is replaced with a signal processing device 12A. Other than this aspect, the remote operation system 1A of this embodiment has the same structure as the remote operation system 1 of the first embodiment.

The signal processing device 12A has the same structure as the signal processing device 12. Therefore, the operation of the signal processing device 12A will be described, with reference to the block diagram of FIG. 5. However, as the server 11 is not connected to the signal processing device 12A, the structure on the side of the server 11 will not be described below. For ease of explanation using the block diagram of FIG. 13, the monitor, the keyboard, and the mouse, which are locally connected to the signal processing device 12A, are also denoted by reference numerals 23, 24, and 25, respectively.

An operator on the side of the signal processing device 12A uses a console that includes the monitor 23, the keyboard 24, and the mouse 25, and makes a request to the signal processing device 12 for access to the server 11 through the signal processing device 12A. At this point, the console screen image of the signal processing device 12A is displayed on the monitor 23, for example. An operation code that is entered from the keyboard 24 or the mouse 25 is inputted into the control unit 127 via the local K/M processing unit 126, and is then converted into an operation code. When receiving an operation code that represents a request for access to the server 11, the control unit 127 makes a request to the signal processing device 12 for access to the server 11 via the communication processing unit 128.

When the communication processing unit 128 of the signal processing device 12A receives an IP packet P that contains the image data of the operation screen image 232 from the signal processing device 12, the control unit 127 of the signal processing device 12A reconstructs the image data in the communication processing unit 128, and inputs the reconstructed image data into the image processing unit 124. In the image processing unit 124, the control unit 127 converts the image data into an analog video signal VA, and inputs the video signal VA into the monitor 23 via the video signal switching unit 123. Thus, the operation screen image 232 of the server 11 is displayed on the monitor 23.

When an operation code is entered from the keyboard 24 or the mouse 25 through the displayed operation screen image 232, the control unit 127 receives the operation code via the local K/M processing unit 126, and generates an operation code based on the received operation code. The operation code is then converted into an IP packet P in the communication processing unit 128, and the IP packet P is transmitted to the signal processing device 12.

In the above manner, the server 11 can be remotely operated. The other aspects and operations of this embodiment are the same as those of the first embodiment, and therefore, explanation of them is omitted herein. The second embodiment is also merely one of the preferred embodiments of the present invention, and more changes and modifications can be made to it.

Third Embodiment

Figure 14:
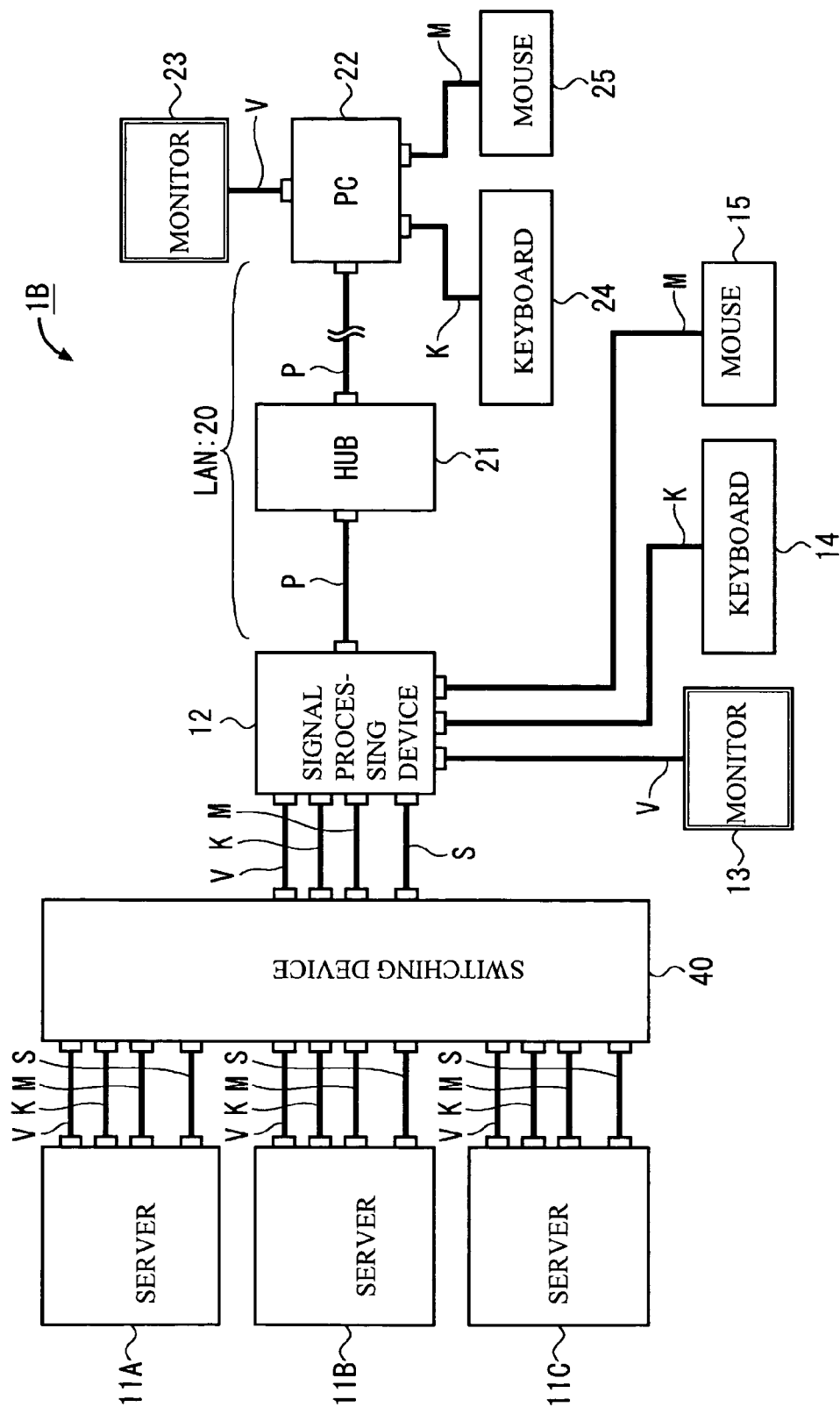
FIG. 14 is a block diagram schematically illustrating the structure of a remote operation system in accordance with a third embodiment of the present invention.

Referring now to FIG. 14, a third embodiment of the present invention will be described in detail. FIG. 14 schematically illustrates the structure of a remote operation system 1B in accordance with this embodiment. In the description below, the same components as those of the first embodiment are denoted by the same reference numerals as those of the first embodiment, and explanation of them will not be provided.

The remote operation system 1B shown in FIG. 14 differs from the remote operation system 1 of the first embodiment shown in FIG. 3 in that the signal processing device 12 is connected to more than one server (three servers 11a through 11c, for example) via a switching device 40. Each of the servers 11a through 11c has the same structure as the server 11 of the first embodiment. Other than this aspect, the remote operation system 1B is the same as the remote operation system 1 of the first embodiment.

The switching device 40 is a structure for selectively connecting the signal processing device 12 to one of the servers 11a through 11c. When the signal processing device 12 makes a request for access to the server 11a via the serial port 114 or the K/M port 113, for example, the switching device 40 forms a path that connects the server 11a and the signal processing device 12 to each other, thereby providing a virtual situation in which the signal processing device 12 and the server 11a are connected directly to each other. The request for access to the server 11a is generated in the control unit 127 in accordance with an operation code that is entered from the PC 22 via the LAN 20 or an operation code that is entered from the keyboard 14 or the mouse 15 locally connected to the signal processing device 12. The request for access is then inputted into the switching device 40.

In the above described manner, the signal processing device 12 is connected to more than one server via the switching device 40. With this structure, only one signal processing device 12 is required for two or more servers, and it is not necessary to employ two or more signal processing devices 12. The other aspects and operations of this embodiment are the same as those of the first embodiment, and therefore, explanation of them is omitted herein.

The computer program product of the present invention may be a recording medium such as a hard disk, CD-ROM and an electronic memory.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A signal processing device that is used for remotely operating a server via an IP network, comprising:
    a first input unit that inputs an operation screen image of the server;
    an image processing unit that generates image data in accordance with the operation screen image;
    a first output unit that outputs the image data to the IP network;
    a second input unit that inputs operation information via the IP network, the operation information being required for operating the server;
    a second output unit that outputs the operation information to the server; and
    an interface via which a keyboard, a mouse and a monitor are connected directly to the signal processing device so that the server can be operated locally in addition to the remotely operating via the IP network.

2. The signal processing device as claimed in claim 1, said interface further comprising:
    a first terminal that connects with the monitor;
    a second terminal that connects with the keyboard or the mouse;
    a third output unit that outputs the operation screen image to the monitor via the first terminal; and
    a third input unit that inputs operation information from the keyboard or the mouse via the second terminal;
    wherein the second output unit outputs the operation information, which is inputted through the third input unit, to the server.

3. The signal processing device as claimed in claim 2, further comprising:
    a determination unit that determines whether the operation information inputted through the third input unit is predetermined operation information;
    a console screen image generating unit that generates a console screen image of the signal processing device, when the operation information is determined to be the predetermined operation information;
    a fourth output unit that outputs the console screen image to the monitor in such a manner that the console screen image is overlaid on the operation screen image; and
    a processing unit that performs predetermined processing in accordance with the operation information inputted from the second input unit through the console screen image displayed on the monitor.

4. The signal processing device as claimed in claim 1, wherein the second output unit outputs the operation information to a keyboard connector or a mouse connector of the server.

5. The signal processing device as claimed in claim 1, wherein the second output unit outputs the operation information to a serial port of the server.

6. The signal processing device as claimed in claim 1 wherein:
    the first input unit inputs a video signal of the operation screen image via a display connector; and
    the image processing unit generates the image data in accordance with the video signal.

7. The signal processing device as claimed in claim 1, wherein the IP network includes a local area network or the Internet.

8. The signal processing device as claimed in claim 1, said interface further comprising a first port via which the operation screen image of the server is output to the monitor connected to the signal processing device.

9. The signal processing device as claimed in claim 1, said interface further comprising:
    a first port via which the operation screen image of the server is output to the monitor connected to the signal processing device; and
    a second port via which local operation information are input to the server, including signals from the keyboard and mouse directly connected to the to the signal processing device,
    the operation information and said local operation information being sent to the server so that the server can selectively use the operation information and said local operation information.

10. The signal processing device as claimed in claim 1, wherein said image processing unit further generates a console screen image and superimposes the console screen image onto the operation screen image data that is input via the first input unit.

11. A remote operation system, comprising:
    a signal processing device that is connected to a server; and
    an information processing apparatus that remotely operates the server through the signal processing device,
    the signal processing device and the information processing apparatus being connected to each other via an IP network
    the signal processing device including:
        a first input unit that inputs an operation screen image of the server;
        an image processing unit that generates image data in accordance with the operation screen image;
        a first output unit that outputs the image data to the information processing apparatus via the IP network;
        a second input unit that inputs operation information from the information processing apparatus via the IP network, the operation information being required for operating the server;
        a second output unit that outputs the operation information to the server, and
        an interface via which a keyboard, a mouse and a display are connected directly to the signal processing device so that the server can be operated locally in addition to the remotely operating via the IP network; and
    the information processing apparatus including:
        a third input unit that inputs the image data outputted from the first output unit;
        a display unit that displays the image data; and
        a third output unit that outputs operation information of the server to the signal processing device via the network, the operation information of the server being inputted in accordance with the display unit.

12. A remote operation system, comprising:
a first signal processing device that is connected to a server;
a second signal processing device that is connected to the first signal processing device via an IP network; and
a monitor that is connected to the second signal processing device,
the first signal processing device including:
a first input unit that inputs an operation screen image of the server;
an image processing unit that generates image data in accordance with the operation screen image;
a first output unit that outputs the image data to the second signal processing device via the IP network;
a second input unit that inputs operation information from the second signal processing device via the IP network, the operation information being required for operating the server;
a second output unit that outputs the operation information to the server; and
an interface via which a keyboard, a mouse and a display are connected directly to the signal processing device so that the server can be operated locally in addition to the remotely operating via the IP network,
the second signal processing device including:
a third input unit that inputs the image data outputted from the first output unit;
a display unit that displays the image data on the monitor; and
a third output unit that outputs operation information of the server to the first signal processing device via the network, the operation information of the server being inputted in accordance with the display unit.

13. A remote operation system, comprising:
a plurality of servers;
a signal processing device that processes a signal outputted from one of the plurality of servers;
a switching device that selectively connects the signal processing device to one of the plurality of servers; and
an information processing apparatus that remotely operates one of the plurality of servers through the signal processing device,
the signal processing device including:
a first input unit that selectively inputs an operation screen image of one of the plurality of servers via the switching device;
an image processing unit that generates image data in accordance with the operation screen image;
a first output unit that outputs the image data to the information processing apparatus via an IP network;
a second input unit that inputs operation information from the information processing apparatus via the IP network, the operation information being required for operating the server;
a second output unit that outputs the operation information to the server via the switching device; and
an interface via which a keyboard, a mouse and a display are connected directly to the signal processing device so that the server can be operated locally in addition to the remotely operating via the IP network,
the information processing apparatus including:
a third input unit that inputs the image data outputted from the first output unit;
a display unit that displays the image data; and
a third output unit that outputs operation information of the server to the signal processing device via the network, the operation information of the server being inputted in accordance with the display unit.

14. A method of processing a signal in a device for remotely operating a server via an IP network, the method comprising:
inputting an operation screen image from the server;
generating image data in accordance with the operation screen image;
outputting the image data to the IP network;
inputting operation information via the IP network, the operation information being required for operating the server;
outputting the operation information to the server; and
interfacing with a keyboard, a mouse and a display so as to be connected directly to the device so that the server can be operated locally in addition to the remotely operating via the IP network.

15. The method as claimed in claim 14, said interfacing further comprising:
outputting the operation screen image to the monitor that is connected to the device; and
inputting operation information through the keyboard or the mouse that is connected to the device,
wherein the operation information, which is inputted through the keyboard or the mouse, is outputted to the server when outputting the operation information to the server.

16. The method as claimed in claim 15, said interfacing further comprising:
determining whether the operation information inputted through the keyboard or the mouse is predetermined operation information;
generating a console screen image of the device, when the operation information is determined to be the predetermined operation information
outputting the console screen image to the monitor in such a manner that the console screen image is overlaid on the operation screen image; and
performing predetermined processing in accordance with operation information inputted through the console screen image displayed on the monitor.

17. A computer readable medium storing a program for causing a computer to remotely operate a server via an IP network via a signal processing device, the computer readable medium causing the computer to execute:
generating image data in accordance with an operation screen image that is inputted from the server;
outputting the image data to the IP network;
inputting operation information via the IP network, the operation information being required for operating the server;
outputting the information the server; and
interfacing with a keyboard, a mouse and a display so as to be connected directly to the device so that the server can be operated locally in addition to the remote operation via the IP network.

18. The computer readable medium as claimed in claim 17, said interfacing further comprising:
outputting the operation screen image to a monitor that is connected to the computer; and
inputting operation information through a keyboard or a mouse that is connected to the computer,
wherein the operation information, which is inputted through the keyboard or the mouse, is outputted to the server in accordance with the instruction for outputting the operation information to the server.

19. The computer readable medium as claimed in claim 18, said interfacing further comprising:
   determining whether the operation information inputted through the keyboard or the mouse is predetermined operation information;
   generating a console screen image of a signal processing device when the operation information inputted through the keyboard or the mouse is determined to be the predetermined operation information;
   outputting the console screen image to the monitor in such a manner that the console screen image is overlaid on the operation screen image; and
   performing predetermined processing in accordance with operation information inputted through the console screen image displayed on the monitor.

* * * * *

UNITED STATES PATENT AND TRADEMARK OFFICE
CERTIFICATE OF CORRECTION

PATENT NO. : 7,299,375 B2  Page 1 of 1
APPLICATION NO. : 10/895933
DATED : November 20, 2007
INVENTOR(S) : Naoyuki Nagao It is certified that error appears in the above-identified patent and that said Letters Patent is hereby corrected as shown below:

Column 16, Line 4, after "claim 1" insert --,--.

Column 16, Line 24, before "signal" delete "to the". (Second Occurrence)

Column 16, Line 42, after "network" insert --,--.

Column 18, Line 36, after "information" insert --;--.

Column 18, Line 53, after "outputting the" insert --operation--.

Column 18, Line 53, after "information" insert --to--.

Signed and Sealed this

Sixth Day of May, 2008

JON W. DUDAS
*Director of the United States Patent and Trademark Office*